US011363813B2

(12) United States Patent
Brown et al.

(10) Patent No.: US 11,363,813 B2
(45) Date of Patent: Jun. 21, 2022

(54) HYDROGELS AS RHEOLOGY MODIFIERS AND METHODS OF MAKING THE SAME

(71) Applicant: WinField Solutions, LLC, Arden Hills, MN (US)

(72) Inventors: Danny Brown, Woodbury, MN (US); Christine Colby, Lino Lakes, MN (US); Lillian Magidow, St. Paul, MN (US); Megan Barta, River Falls, WI (US)

(73) Assignee: WinField Solutions, LLC, Arden Hills, MN (US)

( * ) Notice: Subject to any disclaimer, the term of this patent is extended or adjusted under 35 U.S.C. 154(b) by 55 days.

(21) Appl. No.: 16/673,931

(22) Filed: Nov. 4, 2019

(65) Prior Publication Data

US 2020/0146283 A1 May 14, 2020

Related U.S. Application Data

(60) Provisional application No. 62/758,031, filed on Nov. 9, 2018.

(51) Int. Cl.
*A01N 31/04* (2006.01)
*A01N 25/04* (2006.01)

(52) U.S. Cl.
CPC ............. *A01N 31/04* (2013.01); *A01N 25/04* (2013.01)

(58) Field of Classification Search
None
See application file for complete search history.

(56) References Cited

U.S. PATENT DOCUMENTS 5,474,915 A * 12/1995 Dordick ................. C07H 13/04 435/101
5,572,827 A 11/1996 Conrad
2007/0128121 A1 6/2007 Densmore et al.
2013/0165533 A1* 6/2013 Liao ..................... B01J 13/0039 516/98
2014/0100111 A1* 4/2014 Schultz, Sr. ......... C09D 105/08 504/140
2014/0113821 A1 4/2014 Gu et al.
2014/0259906 A1 9/2014 Shani et al.
2017/0081453 A1* 3/2017 Rodrigues ............ C09D 151/02

(Continued)

FOREIGN PATENT DOCUMENTS

CN 106561682 A 4/2017
CN 107663262 A 2/2018

(Continued)

OTHER PUBLICATIONS

Think USA Dairy, U.S. Dairy Export Council (Whey and Milk Permeate Overview, 2015) (Year: 2015).*

(Continued)

*Primary Examiner* — Dominic Lazaro
(74) *Attorney, Agent, or Firm* — Dorsey & Whitney LLP

(57) ABSTRACT

Hydrogels are blended with water to produce a hydrogel solution. Viscosity of the hydrogel solution is controlled by adjusting the ratio of hydrogel to water and/or by adjusting the blending conditions. The hydrogel solutions may be used to modify the rheology of agricultural compositions. The hydrogel may include lactose, which may be provided by a milk permeate waste stream from the dairy or food processing industry.

16 Claims, 5 Drawing Sheets

100
102 Distributing lactose in water
104 Adjusting pH of lactose solution
106 Adding methacrylic anhydride
108 Adjusting pH of reaction mixture
110 Neutralizing reaction mixture
112 Filtering reaction mixture
114 Exposing precursor mixture to light

(56) References Cited

U.S. PATENT DOCUMENTS

| | | | | |
|---|---|---|---|---|
| 2017/0196175 | A1 | 7/2017 | Shani et al. | |
| 2018/0297902 | A1* | 10/2018 | Chand | C05B 17/00 |
| 2019/0202998 | A1 | 7/2019 | Yang et al. | |

FOREIGN PATENT DOCUMENTS

| | | | |
|---|---|---|---|
| CN | 107663263 | A | 2/2018 |
| EP | 2693893 | A2 | 2/2014 |
| JP | 2006274227 | A | 10/2006 |
| WO | 2017223261 | A2 | 12/2017 |
| WO | 2018030631 | A1 | 2/2018 |

OTHER PUBLICATIONS

"European Search Report for EP App. No. 19208203.0, dated Feb. 11, 2020".
Ahmed, Enas M. , "Hydrogel: Preparation, characterization, and applications: A review", Journal of Advanced Research; vol. 6, 2015, pp. 105-121.
American Dairy Products, Institute, "2013 Dairy Products Utilization and Production Trends", 2013, 5 pages.
Andriola, Amanda K. et al., "The effect of sterilization methods on the thermo-gelation", Polymer Degradation and Stability 95 (2010) 254-259.
Andrzejewska, Ewa, "Photopolymerization kinetics of multifunctional monomers", Prog. Polym. Sci.; vol. 26, 2001, pp. 605-665.
Bhattacharyya, Lokesh et al., "Appendix 2 Dissociation Constants (pka) of Common Sugars and Alcohols", 2012, pp. 455-456.
Burdick, Jason A. et al., "Hyaluronic Acid Hydrogels for Biomedical Applications", Adv. Mater; vol. 23, No. 12, Mar. 25, 2011, 31 pages.
Decker, C, "Photoinitiated Crosslinking Polymerisation", Prog. Polym. Sci.; vol. 21, 1996, pp. 593-650.
Fan, Xiao-Dong et al., "Synthesis and Characterization of Lactose Based Resorcinol Resin", Journal of Applied Polymer Science; vol. 86, 2002, pp. 2581-2585.
Fang, Wei-Hai, "Photodissociation of Acrylic Acid in the Gas Phase: An ab Initio Study", J. Am. Chem. Soc.; vol. 122, 2000, pp. 10886-10894.
Feng, Shuting, "Determination of Proton Affinities and Acidity Constants of Sugars", J. Phys. Chem.; vol. 117, 2013, pp. 5211-5219.
Guilherme, Marcos R. , "Superabsorbent hydrogels based on polysaccharides for application in agriculture as soil conditioner and nutrient carrier: A review", European Polymer Journal; vol. 72, 2015, pp. 365-385.
Hoijemberg, Pablo A. et al., "Two Routes Towards Photoinitiator-Free Photopolymerization in Miniemulsion: Acrylate Self-Initiation and Photoactive Surfactant", Macromol. Chem. Phys.; vol. 212, 2011, pp. 2417-2422.
Hou, Sijian et al., "Facile Synthesis of Chain-End Functionalized Glycopolymers for Site-Specific Bioconjugation", Bioconjugate Chem.; vol. 15, 2004, pp. 954-959.
Hu, Fangyu et al., "Nondestructive Quantification of Organic Compunds in Whole Mile without Pretreatment by Two-Dimensional NMR Spectroscopy", J. Agric. Food Chem.; vol. 55, 2007, pp. 4307-4311.
Huang, Yongshun et al., "Lactose-Containing Hydrogels for Enzyme Stabilization", Journal of Polymer Science; vol. 54, 2016, pp. 2507-2514.
Huang, Yongshun et al., "Synthesis and Anticoagulant Activity of Polyureas Containing Sulfated Carbohydrates", Biomacromolecules; vol. 15, 2014, pp. 4455-4466.
Illanes, A , "Lactose-Derived Prebiotics Chapter 1 Lactose: Production and Upgrading", 2016, 33 pages.
Khoushabi, A et al., "Photo-polymerization, swelling and mechanical properties of cellulose fibre reinfored poly(ethylene glycol) hydrogels", Composites Science and Technology; vol. 119, 2015, pp. 93-99.
Knolle, W. et al., "Direct (222 nm) photopolymerisation of acrylates. A Taser flash photolysis and quantum chemical study", Radiation Physics and Chemistry; vol. 67, 2003, pp. 341-345.
Kosemund, Kirstin et al., "Safety evaluation of superabsorbent baby diapers", Regulatory Toxicology and Pharmacology; vol. 53, 2009, pp. 81-89.
Leach, Jennie B. et al., "Photocrosslinked Hyaluronic Acid Hydrogels: Natural, Biodegradable Tissue Engineering Scaffolds", Biotechnology and Bioengineering; vol. 82, No. 5, Jun. 5, 2003, pp. 578-589.
Lee, Juneyoung et al., "Trehalose hydrogels for stabilization of enzymes to heat", Polym. Chem.; vol. 6, 2015, pp. 3443-3448.
Lee, Kyung M. et al., "Initiatorless Photopolymerization of Liquid Crystal Monomers", ACS Appl. Mater. Interfaces; vol. 8, 2016, pp. 28040-28046.
Lin, Weiping et al., "Solution copolymerization of D-lactose-O-(p-vinylbenzyl)-hydroxime with acrylonitrile", Polymer; vol. 39 No. 20, 1998, pp. 4911-4914.
Mathur, Arvind M. et al., "Methods for Synthesis of Hydrogel Networks: A Review", J. Macromolecular Sci.; vol. 36, 1996, pp. 405-430.
Ortega, Alicia M. et al., "Structure-Property Relationships in Photopolymerizable Polymer Networks: Effect of Composition on the Crosslinked Structure and Resulting Thermomechanical Properties of a (Meth)acrylate-Based System", J. Appl. Polym. Sci.; vol. 110, 2008, pp. 1559-1572.
Patel, Vijay R. et al., "Preparation and CHaracterization of Freeze-dried Chitosan-Poly(Ethylene Oxide) Hydrogels for Site-Specific Antibiotic Delivery in the Stomach", Pharmaceutical Research; vol. 13, No. 4, 1996, pp. 588-593.
Patil, Nitin et al., "Sucrose Diacrylate: A Unique Chemically and Biologically Degradable Crosslinker for Polymeric Hydrogels", J Polym Sci A: Polym Chem; vol. 35, 1997, pp. 2221-2229.
Patil, Nitin S. et al., "Macroporous poly)sucrose acrylate) hydrogel for controlled release of macromolecules", Biomaterials; vol. 17, 1996, pp. 2343-2350.
Peppas, N A. et al., "Hydrogels in pharmaceutical formulations", European Journal of Pharmaceutics and Biopharmaceutics; vol. 50, 2000, pp. 27-46.
Saeko, Murakami et al., "Bio-Based Hydrogels Prepared by Cross-Linking of Microbial Poly([gamma]-glutamic acid) with Various Saccharides",, vol. 7, No. 7, Jul. 1, 2006 (Jul. 1, 2006), pp. 2122-2127.
Shantha, K L. et al., "Synthesis and Evaluation of Sucrose-Containing Polymeric Hydrogels for Oral Drug Delivery", Journal of Applied Polymer Science; vol. 84, 2002, pp. 2597-2604.
Singh, Baljit et al., "Synthesis and characterization of agar-starch based hydrogels for slow herbicide delivery applications", International Journal of Plastics Technology, Central Institute of Plastics Engineering & Technology, Cipet, IN, vol. 19, No. 2, Dec. 16, 2015 (Dec. 16, 2015), pp. 263-274.
Slaughter, Brandon V. et al., "Hydrogels in Regenerative Medicine", Adv Mater; vol. 21, Sep. 4, 2009, pp. 3307-3329.
Sun, Xue-Long et al., "Glycosaminoglycan Mimetic Biomaterials. 4. Synthesis of Sulfated Lactose-Based Glycopolymers That Exhibit Anticoagulant Activity", Biomacromolecules; vol. 3, 2002, pp. 1062-1070.
Sundekilde, Ulrik K. et al., "Relationship between the Metabolite Profile and Technological Properties of Bovine Milk from Two Dairy Breeds Elucidated by NMR-Based Metabolomics", J. Agric. Food Chem.; vol. 59, 2011, pp. 7360-7367.
Usda, "Dairy Products 2017 Summay (Apr. 2018)", National Agricultural Statistics Service, Apr. 2018, 58 pages.
Van Den Bulcke, An I et al., "Structural and Rheological Properties of Methacrylamide Modified Gelatin Hydrogels", Biomacromolecules; vol. 1, 2000, pp. 31-38.
Van Dijk-Wolthuis, W.N.E et al., "Synthesis, Characterization, and Polymerization of Glycidyl Methacrylate Derivatized Dextran", Macromolecules; vol. 28, 1995, pp. 6317-6322.
Van Vlierberghe, S et al., "Biopolymer-Based Hydrogels as Scaffolds for Tissue Engineering Applications: A Review", Biomacromolecules; vol. 12, 2011, pp. 1387-1408.

(56) References Cited

OTHER PUBLICATIONS

Walter, et al., "H-sensitive acrylic-based copolymeric hydrogels for the controlled release of a pesticide and a micronutrient", Journal of Applied Polymer Science, vol. 87, No. 3, Jan. 18, 2003 (Jan. 18, 2003), pp. 394-403.
Wang, Huiliang et al., "Self-Initiated Photopolymerization and Photografting of Acrylic Monomers", Macromol. Rapid Commun.; vol. 25, 2004, pp. 1095-1099.
Wang, Qun et al., "Synthesis and Application of Crabohydrate-Containing Polymers", Chem. Mater.; vol. 14, 2002, pp. 3232-3244.
Zhou, Wen-Jing et al., "Synthesis and Characterization of New Styrene Main-Chain Polymer with Pendant Lactose Moiety through Urea Linkage", Macromolecules; vol. 32, 1999, pp. 5507-5513.
Zhou, Wen-Jing et al., "Synthesis and Characterization of Random Hydrophilic/Hydrophobic Copolymers of Styrene and D-Lactose-O Vinylbenzylhydroxime", Journal of Polymer Science: Part A: Polymer Chemistry; vol. 36, 1998, pp. 2971-2978.
Zhou, Wen-Jing et al., "Synthesis and Properties of a Novel Water-Soluble Lactose-Containing Polymer and Its Cross-Linked Hydrogel", Macromolecules; vol. 30, 1997, pp. 7063-7068.
Zhou, Wen-Jing , "Synthesis and Thermal Properties of a Novel Lactose-Containing Poly(N-isopropylacrylamide-co-acrylamidolactamine) Hydrogel", Journal of Polymer Science: Part A: Polymer Chemistry; vol. 37, 1999, pp. 1393-1402.

* cited by examiner

HYDROGELS AS RHEOLOGY MODIFIERS AND METHODS OF MAKING THE SAME

CROSS REFERENCE TO RELATED APPLICATIONS

The present application claims priority to U.S. Provisional Patent Application No. 62/758,031, filed Nov. 9, 2018, entitled "Hydrogels As Rheology Modifiers and Methods of Making the Same," and is related to U.S. Non-Provisional patent application Ser. No. 16/185,406, filed Nov. 9, 2018, entitled "Lactose-Derived Hydrogels and Methods of Making the Same," and to U.S. Provisional Patent Application No. 62/758,049, filed Nov. 9, 2018, entitled "Hydrogels As Carriers of Active Ingredients and Methods of Producing the Same," all of which are hereby incorporated herein by reference in their entireties.

TECHNICAL FIELD

The present disclosure relates generally to hydrogels for use as rheology modifiers and methods of producing the same.

BACKGROUND

Rheology modifiers are used to modify the viscosity of numerous agents including those in the agriculture, biomedical, cosmetic, food manufacturing, personal hygiene, and pharmaceuticals, and personal hygiene industries. Depending on the application, rheology modifiers may be difficult to produce or obtain, challenging to handle, expensive, and/or environmentally unfriendly.

SUMMARY

Some implementations provide methods of modifying the rheology of an agricultural composition. In embodiments, a method of modifying the rheology of an agricultural composition includes providing an agricultural composition and a hydrogel, blending the hydrogel in a liquid to produce a hydrogel solution, and adding the hydrogel solution to the agricultural composition. The hydrogel solution modifies the rheology of the agricultural composition.

In embodiments, a ratio of the liquid to the hydrogel is from about 0.25:1 to about 60:1. The ratio of the liquid to the hydrogel may be from about 0.5:1 to about 10:1. The ratio of the liquid to the hydrogel may from about 10:1 to about 50:1.

In embodiments, the liquid is water.

In embodiments, the hydrogel includes a sugar. The sugar may be a dairy sugar.

In embodiments, the sugar may be lactose. The lactose may be from one or more of purified lactose, milk permeate, whey, whey permeate, de-lactosed permeate, de-proteinized whey, dairy-derived polysaccharides, buttermilk, skim milk, mammalian milk, whole milk powder, non-fat dry milk, and butter milk powder. The lactose may be from a waste product of a dairy or food processing operation. The waste product may be milk permeate.

In embodiments, the hydrogel includes a crosslinking agent. The crosslinking agent may include methacrylic anhydride.

In embodiments, the viscosity of the agricultural composition is increased or decreased.

In embodiments, the agricultural composition is formulated as a liquid.

In embodiments, the agricultural composition includes at least one of an adjuvant, fertilizer, humectant, micronutrient, macronutrient, plant growth regulator, seed treatment, or pesticide.

DETAILED DESCRIPTION

Figure 1:
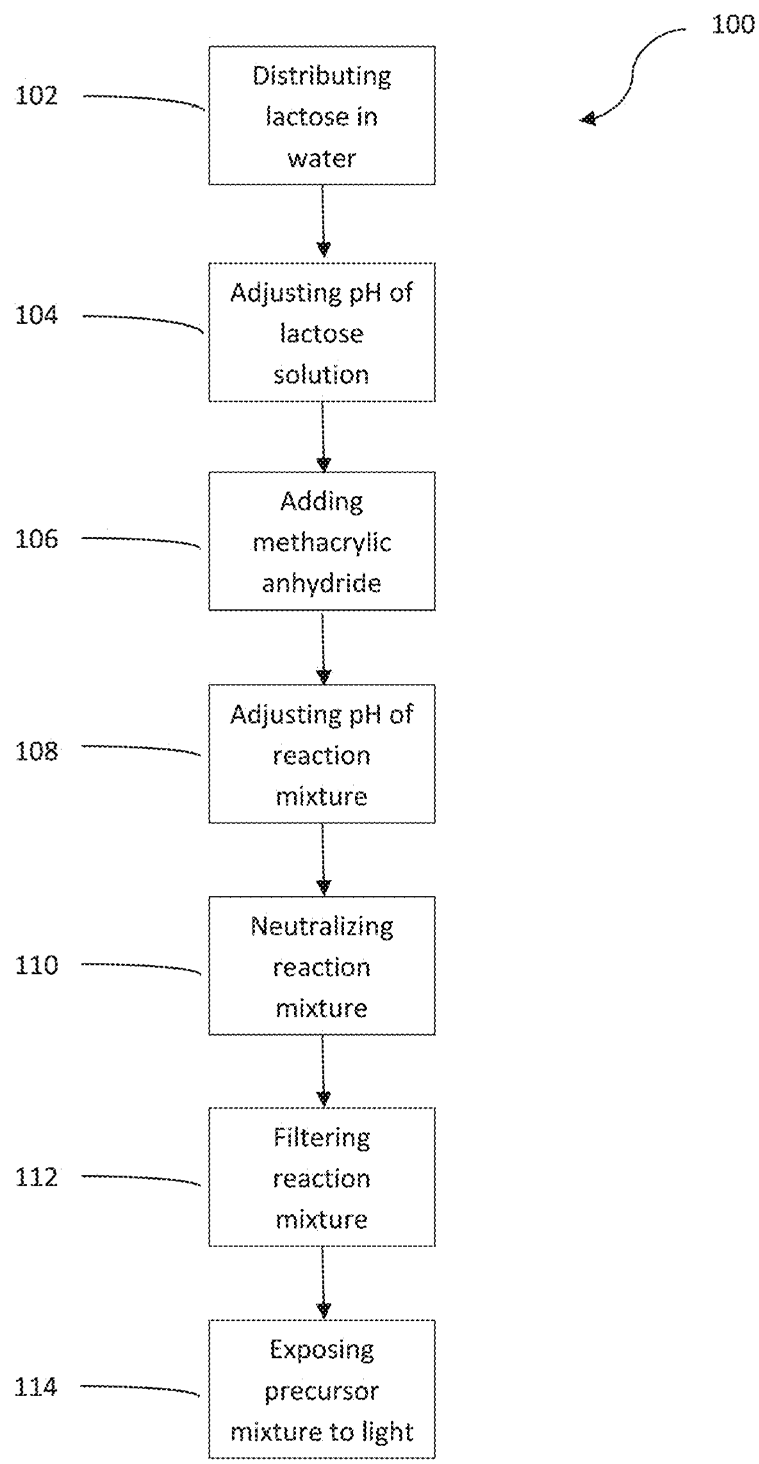
FIG. 1 is a flow diagram of a hydrogel preparation method according to one embodiment.

Hydrogel solutions are disclosed herein. The solutions include hydrogels blended with water. Methods of preparing the hydrogels and the hydrogel solutions are also disclosed. The methods are atom economical (i.e., do not produce waste), environmentally friendly, and do not produce volatile organic compounds.

As used herein, the term "hydrogel" refers to hydrophilic polymer networks that may be swollen with water and are generally capable of absorbing water at loadings many times greater than their dry mass. The network structures may be formed with covalent bonds between polymer chains, but can also be constructed with physical crosslinks arising from, for example, chain entanglement, electrostatic interactions, and associations via strong hydrogen bonding or van der Waals interactions. The incorporation of carbohydrates into the polymer structure may introduce hydrophilicity that is helpful for the preparation of hydrogels. Sugar-containing polymers may function as hydrogels via polymer chemistries such as polyureas, phenolics, and free radical polymerization of styrenic and acrylamide derivatives.

Hydrogel Formulations

Any hydrogel known in the art may be suitable for use in hydrogel solutions, which are described in detail below. In some embodiments, the presently disclosed hydrogels may be generally understood as a composition including at least one sugar and a crosslinking agent.

The sugar may be a dairy sugar. In some embodiments, the sugar is lactose. While lactose is used as an example of a suitable sugar, and lactose-derived hydrogels are described in detail throughout the present disclosure, the compositions of suitable hydrogels for use in the disclosed hydrogel solutions are not limited to those that include lactose.

The lactose may include either or both of the α- and β-anomers of lactose.

The lactose may be derivatized lactose, such as esterified lactose. In one example, the esterified lactose is lactose methacrylate. Lactose may be derivatized at any one or more of the eight free hydroxyl groups. Lactose methacrylate may include lactose mono-methacrylate, lactose di-methacrylate, lactose tri-methacrylate, higher lactose methacrylates, or any combination thereof. The methacrylate monomers may be present in any proportion.

The lactose may be an isolated and/or relatively pure lactose. For example, the lactose may be a commercially available lactose monohydrate having≥94% α-lactose. The lactose, or other dairy sugar, may be provided in milk permeate, whey, whey permeate, de-lactosed permeate, de-proteinized whey, dairy-derived polysaccharides, buttermilk, skim milk, mammalian milk, whole milk powder, non-fat dry milk, butter milk powder, or any combination thereof. The lactose may be provided in a waste stream from, for example, a dairy or food processing operation. In one example, the lactose is provided in waste milk permeate from a dairy operation.

In the implementations and use of a lactose-derived hydrogel, sourcing lactose and/or other dairy sugars from an existing waste stream may help utilize an untapped feedstock, reduce the cost of producing the lactose-derived hydrogel, and/or reduce the cost of producing the material that generated the lactose-containing waste stream.

In some examples, the lactose is dissolved in water prior to combining the lactose with the acrylic acid derivative.

The crosslinking agent may be an acrylic acid derivative. The acrylic acid derivative may be methacrylic anhydride, methacrylic monomers, methacryloyl chloride, activated acrylates, acrylic anhydride, acrylic acid, or any combination thereof. In one example, the acrylic acid derivative is methacrylic anhydride.

In some embodiments, the lactose and methacrylic anhydride may be combined to form a hydrogel precursor mixture. In some examples, lactose and methacrylic anhydride are combined in the presence of sodium hydroxide to produce a hydrogel precursor mixture including lactose methacrylate, sodium methacrylate, and/or methacrylic acid.

The ratio of lactose to methacrylic anhydride in the precursor mixture may be from about 1.0:0.1 to about 1.0:3.0, such as about 1.0:0.1, about 1.0:0.5, about 1.0:1.0, about 1.0:2.0, or about 1.0:3.0.

In some implementations, the disclosed lactose-derived hydrogels utilize a lactose source that has been known as a waste byproduct or waste stream from a separate manufacturing process. The lactose-derived hydrogels may be biodegradable. The lactose-derived hydrogels, and the methods of making them, may be more environmentally friendly than known hydrogels and production methods. The methods are described in more detail immediately below.

Methods of Producing Lactose-Derived Hydrogels

Methods of producing the disclosed lactose-derived hydrogels include copolymerizing lactose methacrylate, methacrylic acid, and sodium methacrylate in a one-pot reaction using light-induced photopolymerization in the absence of a photoinitiator. No volatile organic compounds or waste products are generated by the methods.

FIG. 1 illustrates a method 100 of preparing a lactose-derived hydrogel. The method 100 includes a step 102 of distributing lactose in water to produce a lactose solution, a step 104 of adjusting the pH of the lactose solution, a step 106 of adding methacrylic anhydride to the lactose solution to produce a reaction mixture, a step 108 of adjusting the pH of the reaction mixture, an optional step 110 of neutralizing the reaction mixture, an optional step 112 of filtering the reaction mixture to produce a hydrogel precursor mixture, and a step 114 of exposing the hydrogel precursor mixture to light to produce a lactose-derived hydrogel.

In step 102, the lactose and water may be stirred, which may help distribute the lactose. Additionally or alternatively, the lactose and water may be heated, such as from about 25° C. to about 90° C., or about 65° C. to about 90° C., which may help distribute the lactose. The lactose and water may be stirred and/or heated until the lactose is partially or completely dissolved in the water to produce a lactose solution.

The lactose may be an isolated and/or relatively pure lactose. For example, the lactose may be a commercially available lactose monohydrate having≥94% α-lactose. The lactose may be provided in milk permeate, whey, whey permeate, de-lactosed permeate, de-proteinized whey, dairy-derived polysaccharides, buttermilk, skim milk, mammalian milk, whole milk powder, non-fat dry milk, butter milk powder, or any combination thereof. The lactose may be provided in a waste stream from, for example, a dairy or food processing operation. In one example, the lactose is provided in waste milk permeate from a dairy operation.

The lactose solution produced in step 102 may be cooled, such as passively to room temperature, prior to step 104.

In step 104, the pH of the lactose solution is adjusted to a pH of at most about 10. In one example, aqueous sodium hydroxide is added to the solution to increase the pH. In one example, the lactose in step 102 is provided by milk permeate and the lactose solution has an unadjusted pH of about 6.2 to about 6.4.

In step 106, the lactose solution and methacrylic anhydride may be stirred together. Methacrylic anhydride may be added in an amount that yields a desired ratio of lactose to methacrylic anhydride. In one example, the molar ratio of lactose to methacrylic anhydride is about 1.0:0.5. The lactose and methacrylic anhydride may react to produce lactose methacrylate.

In step 108, the pH of the reaction mixture is adjusted to a pH of at most about 10. In one example, a pH of about 9.5±0.5 is maintained with the slow addition of aqueous sodium hydroxide.

In one example, the lactose is functionalized with methacrylate groups by esterification with methacrylic anhydride to produce lactose methacrylate. The lactose methacrylate may include lactose mono-methacrylate, lactose di-methacrylate, lactose tri-methacrylate, and/or higher lactose methacrylate monomers. In the example, sodium methacrylate is generated as a by-product of the esterification and as a result of hydrolysis. Methacrylic acid is also generated in the esterification reaction. The lactose methacrylate, sodium methacrylate, and/or methacrylic acid may copolymerize.

In some implementations, the reaction mixture is allowed to stir, such as for about 30 minutes at room temperature, after the addition of sodium hydroxide and before step 110.

In step 110, the reaction mixture may be neutralized to a pH of about 7. In one implementation, the reaction mixture is neutralized by the addition of hydrochloric acid. In some implementations, step 110 is not performed.

In optional step 112, the reaction mixture may be filtered by, for example, gravity filtration, vacuum filtration, or centrifugation, which may help to remove insoluble particles. In one implementation, the reaction mixture is gravity filtered through qualitative filter paper. The filtrate is used in step 114 as a hydrogel precursor mixture.

In step 114, the hydrogel precursor mixture is exposed to light, which may help to induce self-initiated copolymerization of lactose methacrylate, methacrylic acid, and sodium methacrylate. Lactose di- and higher methacrylates may serves as crosslinkers during polymerization. In one example, the light is in the ultraviolet spectrum. In one example, the UV light has a wavelength of about 365 nm and/or an intensity of about 3.4 $mW/cm^2$ to about 3.8 $mW/cm^2$. In one example, the hydrogel precursor mixture is exposed to UV light for about 60 minutes at room temperature.

Lactose-derived hydrogels produced by the method 100 may have various consistencies, which may be related to the (mol:mol) ratio of lactose to methacrylic anhydride. In one example, a hydrogel precursor mixture having a 1.0:0.5 lactose:methacrylic anhydride ratio produced a hydrogel having a gelatin-like consistency. In one example, a hydrogel precursor mixture having a 1.0:0.1 lactose:methacrylic anhydride ratio produced a hydrogel having a mucilaginous consistency. In general, as the proportion of methacrylic anhydride compared to lactose decreased, the resulting hydrogel became softer and more liquid-like.

Methods disclosed herein of producing lactose-derived hydrogels may have numerous benefits, including benefits over known methods of producing hydrogels. The disclosed methods may employ green chemistry techniques and/or be more environmentally friendly than known production methods. The disclosed methods may utilize a lactose source that has been known as a waste byproduct or waste stream from a separate manufacturing process, such as from the dairy or food processing industry. The disclosed methods may be more cost-effective than known methods.

Photopolymerization of lactose methacrylate, methacrylic acid, and sodium methacrylate monomers may proceed in the absence of a photoinitiator, which permits exclusion of a photoinitiator from the methods. The disclosed methods may achieve high polymerization rates, even in the absence of a photoinitiator.

Other benefits may include, but are not limited to, performing the method in water, performing the method at ambient temperature, producing no waste (i.e., the method is atom economic), and/or producing no volatile organic compound by the method.

Hydrogel Solutions

The hydrogels described above may be combined with a liquid and blended to form a hydrogel solution. The viscosity of the hydrogel solution may be controlled by adjusting the ratio of lactose to methacrylic anhydride in the hydrogel, the ratio of hydrogel and liquid in the solution, and/or the blending conditions. Blending conditions are described in Methods of Producing Hydrogel Solutions immediately below.

Figure 4:
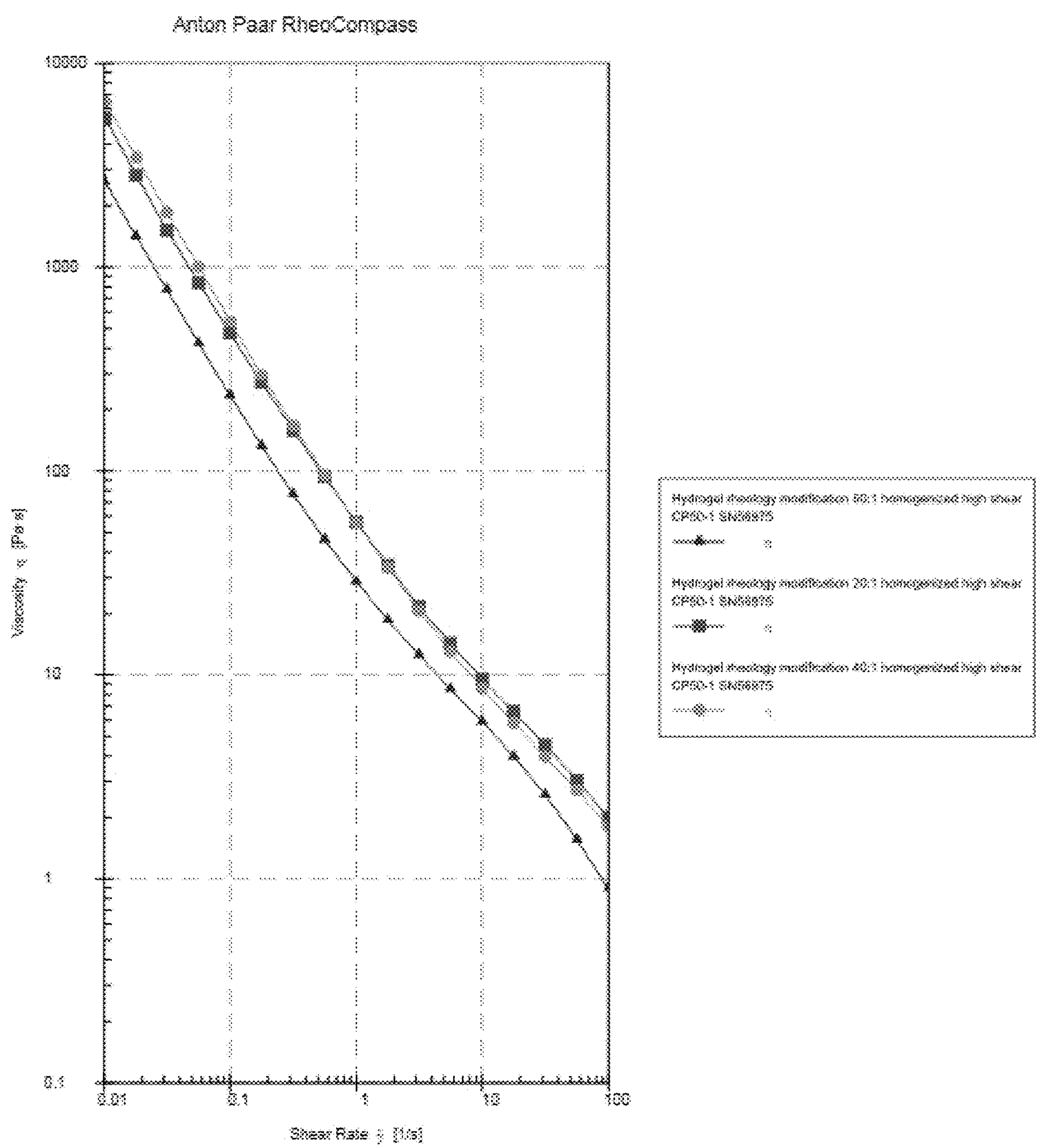
Figure 5:
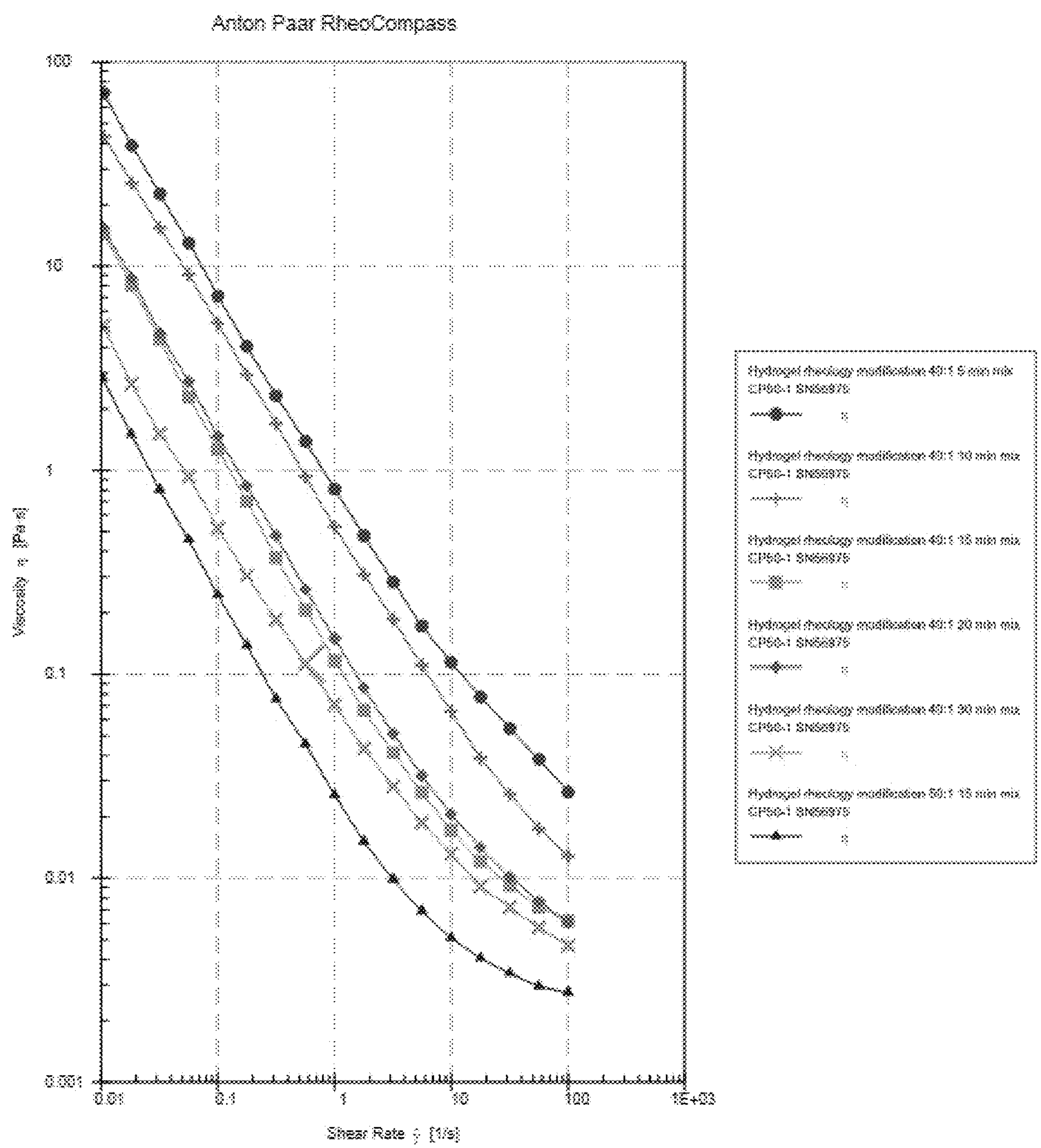

As described in more detail in Examples 3-5 and as shown in FIGS. 4 and 5, the hydrogel solutions may demonstrate an increased viscosity compared to water alone. The hydrogel solutions may demonstrate shear thinning behavior. Addition of hydrogels to a bulk liquid may modify the viscosity of the bulk liquid.

As described above, a lactose-derived hydrogel may include any desired ratio of lactose to methacrylic anhydride. In one example, the molar ratio of lactose to methacrylic anhydride is about 1.0:0.5.

The hydrogel may be blended with a liquid to produce a hydrogel solution. The hydrogel solution may have a weight liquid:weight hydrogel ratio of about 0.25:1 to about 500:1, about 0.25:1 to about 400:1, about 0.25:1 to about 300:1, about 0.25:1 to about 200:1, about 0.25:1 to about 100:1, about 0.25:1 to about 50:1, about 0.25:1 to about 40:1, about 0.25:1 to about 30:1, about 0.25:1 to about 20:1, about 0.25:1 to about 10:1, about 0.25:1 to about 5:1, about 0.25:1 to about 1:1, about 0.5:1 to about 500:1, about 1:1 to about 500:1, about 5:1 to about 500:1, about 10:1 to about 500:1, about 20:1 to about 500:1, about 30:1 to about 500:1, about 40:1 to about 500:1, about 50:1 to about 500:1, about 100:1 to about 500:1, about 200:1 to about 500:1, about 300:1 to about 500:1, about 400:1 to about 500:1, about 0.5:1 to about 50:1, about 0.5:1 to about 10:1, or about 10:1 to about 50:1.

The hydrogel solutions may be added to an agent to modify the rheology of the agent. The agent may be, for example an agricultural composition. The agricultural composition may be or may comprise, for example, an adjuvant, fertilizer, humectant, micronutrient, macronutrient, plant growth regulator, seed treatment, or pesticide. As used herein, a pesticide may be, for example, an herbicide, insecticide, fungicide, nematicide, or rodenticide. The agricultural composition may be formulated as a liquid, such as a liquid that may be sprayed on or otherwise delivered to a desired location. For example, the agricultural composition may be delivered to a desired location via fertigation. In some implementations, the hydrogel solutions are added to a drift reduction adjuvant to modify the rheology of the adjuvant. The liquid atomization behavior of the adjuvant may be altered, which may reduce the formation of fine droplets. In some implementations, the hydrogel solutions are added to suspension concentrates to act as a structuring agent, to add viscosity, and/or to help maintain solid materials in suspension.

Methods of Producing Hydrogel Solutions

Figure 2:
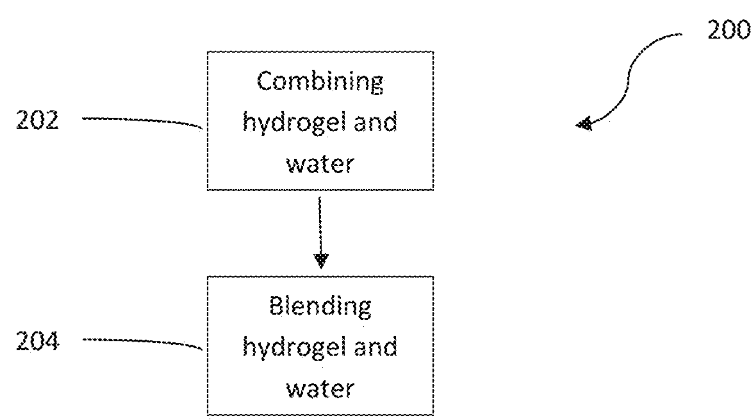
FIG. 2 is a flow diagram of a hydrogel solution preparation method according to one embodiment.

FIG. 2 illustrates a method 200 of preparing a hydrogel solution. The method 200 includes a step 202 of combining a hydrogel and liquid, and a step 204 of blending the hydrogel and liquid to form a hydrogel solution.

In step 202, the hydrogel may be a lactose-derived hydrogel, such as the ones described above or in U.S. Non-Provisional patent application Ser. No. 16/185,406, filed Nov. 9, 2018, entitled "Lactose-Derived Hydrogels and Methods of Making the Same." The liquid may be aqueous or non-aqueous. In one example, the liquid is water.

The hydrogel and liquid may be combined in a weight liquid:weight hydrogel ratio of about 0.25:1 to about 500:1, about 0.25:1 to about 400:1, about 0.25:1 to about 300:1, about 0.25:1 to about 200:1, about 0.25:1 to about 100:1, about 0.25:1 to about 50:1, about 0.25:1 to about 40:1, about 0.25:1 to about 30:1, about 0.25:1 to about 20:1, about 0.25:1 to about 10:1, about 0.25:1 to about 5:1, about 0.25:1 to about 1:1, about 0.5:1 to about 500:1, about 1:1 to about 500:1, about 5:1 to about 500:1, about 10:1 to about 500:1, about 20:1 to about 500:1, about 30:1 to about 500:1, about 40:1 to about 500:1, about 50:1 to about 500:1, about 100:1 to about 500:1, about 200:1 to about 500:1, about 300:1 to about 500:1, about 400:1 to about 500:1, about 0.5:1 to about 50:1, about 0.5:1 to about 10:1, or about 10:1 to about 50:1.

In step 204, the blending may be homogenization. The blending may be performed by, for example, a high shear mixer, a rotor stator, or a wet media mill. In one example, the hydrogel and liquid are high sheared at about 4000 rpm.

The hydrogel and liquid may be blended for an amount of time that produces a desired degree of mixing. In some implementations, the hydrogel and liquid are blended for relatively shorter times when the blending speed is relatively faster. In some implementations, the hydrogel and liquid are blended for relatively longer times when the blending speed is relatively slower. Examples of blending times are about 2 minutes to about 40 minutes, about 2 minutes to about 35 minutes, about 2 minutes to about 30 minutes, about 2 minutes to about 25 minutes, about 2 minutes to about 20 minutes, about 2 minutes to about 15 minutes, about 2 minutes to about 10 minutes, about 2 minutes to about 5 minutes, about 5 minutes to about 40 minutes, about 10 minutes to about 40 minutes, about 15 minutes to about 40 minutes, about 20 minutes to about 40 minutes, about 25 minutes to about 40 minutes, about 30 minutes to about 40 minutes, about 35 minutes to about 40 minutes, or about 4 minutes to about 30 minutes.

The hydrogel solution may appear hazy. In some examples, homogenized hydrogel particles settle out of the hydrogel solution over time. In some examples, step 204 is not performed and the hydrogel at least partially dissociates in the liquid over time.

In some implementations, a hydrogel is dried and later rehydrated. In one example, a dried hydrogel is added to a vessel and a liquid is also added to the vessel. The liquid may be water or an agricultural composition. The dried hydrogel may be in powder form. The vessel may be a spray tank. The liquid may rehydrate the dried hydrogel before or as the hydrogel is applied to a desired location. The hydrogel may affect the rheology of the liquid.

In some implementations, a hydrogel is not dried. In one example, an undried hydrogel is added to a vessel and a liquid is also added to the vessel. The liquid may be water or an agricultural composition. The undried hydrogel may be in liquid, gel, semi-solid, or solid form. The vessel may be a spray tank. The hydrogel may absorb none, some, or all of the liquid before or as the hydrogel is applied to a desired location.

In some implementations, the hydrogel precursor mixture is not crosslinked before being delivered to a target. In some implementations, the hydrogel precursor mixture is crosslinked after being delivered to a target. The hydrogel precursor mixture may crosslink to form a hydrogel via exposure to ambient light. In one example, the hydrogel precursor mixture is sprayed as droplets on an agricultural target, such as a plant; crosslinking upon application increases the viscosity of the droplets, which may in turn affect how quickly the droplets evaporate, the flow pattern within the droplets, and/or the uptake of the droplets by the plants.

EXAMPLES

The following examples illustrate various aspects of the disclosure and should not be considered limiting.

Example 1

Preparation of Lactose-Derived Hydrogels

Lactose-derived hydrogels were prepared according to the methods described in U.S. Non-Provisional patent application Ser. No. 16/185,406, filed Nov. 9, 2018, entitled "Lactose-Derived Hydrogels and Methods of Making the Same," the contents of which are hereby incorporated by reference in their entirety. Briefly, a hydrogel having a 1.0:0.5 lactose: methacrylic anhydride (mol:mol) ratio was prepared as follows.

To a 100 mL round-bottom flask equipped with a magnetic stirbar was added permeate powder (10.0 g) and deionized water (20 mL). The mixture was stirred at 65° C. until a clear, colorless solution was produced (about 15 minutes). The solution was then allowed to cool to room temperature and aqueous sodium hydroxide (2.5 M, about 3 drops) was added until the solution had a pH of about 10. Methacrylic anhydride (2.07 mL; 94%, with 2000 ppm tropanol A as inhibitor, MilliporeSigma, St. Louis, Mo.) was added and the mixture was stirred vigorously. A pH of 9.5±0.5 was maintained with the slow addition of aqueous sodium hydroxide (4.89 mL); the pH was not allowed to exceed 10. After the addition of sodium hydroxide was complete, the reaction mixture was allowed to stir at room temperature for 30 minutes.

Hydrochloric acid (0.75 mL; 1 M; ACS Plus, Thermo Fisher Scientific, Hampton, N.H.) was added to neutralize the reaction mixture to pH 7. The mixture was then centrifuged and decanted to yield a hydrogel precursor mixture, which was transferred to a polystyrene petri dish.

The hydrogel precursor mixture was then UV irradiated (365 nm, 3.4-3.8 mW/cm$^2$) for 60 minutes at room temperature. Photo-induced copolymerization of lactose methacrylate, methacrylic acid, and sodium methacrylate in the precursor mixture yielded a hydrogel.

Example 2

Rheological Analysis of Uncured Hydrogel Precursor Mixtures

Hydrogel precursor mixtures having a 1.0:0.5 lactose: methacrylic anhydride (mol:mol) ratio were prepared according to the method of Example 1. The hydrogel precursor mixtures were not irradiated and a hydrogel was not formed.

The hydrogel was added to a 100 mL beaker with water. The hydrogel and water were high sheared at 4000 rpm for 15 minutes to homogenize the gel into small particles. Hydrogel solutions were prepared with the following weight:weight ratios of water to hydrogel: (A) 10:1—10 g water:1 g hydrogel; (B) 1:1—1 g water:1 g hydrogel; (C) 2:1—2 g water:1 g hydrogel; and (D) 1:2—1 g water: 2 g hydrogel.

After homogenization, 1 mL of each solution was decanted via pipet to separate the liquid from any remaining particulate and was tested on an MCR Rheometer (Anton Paar, Graz, Austria). The density of each solution was determined before the solution was tested on the MCR Rheometer. The density of each solution supernatant was about 1 g/mL.

Figure 3:
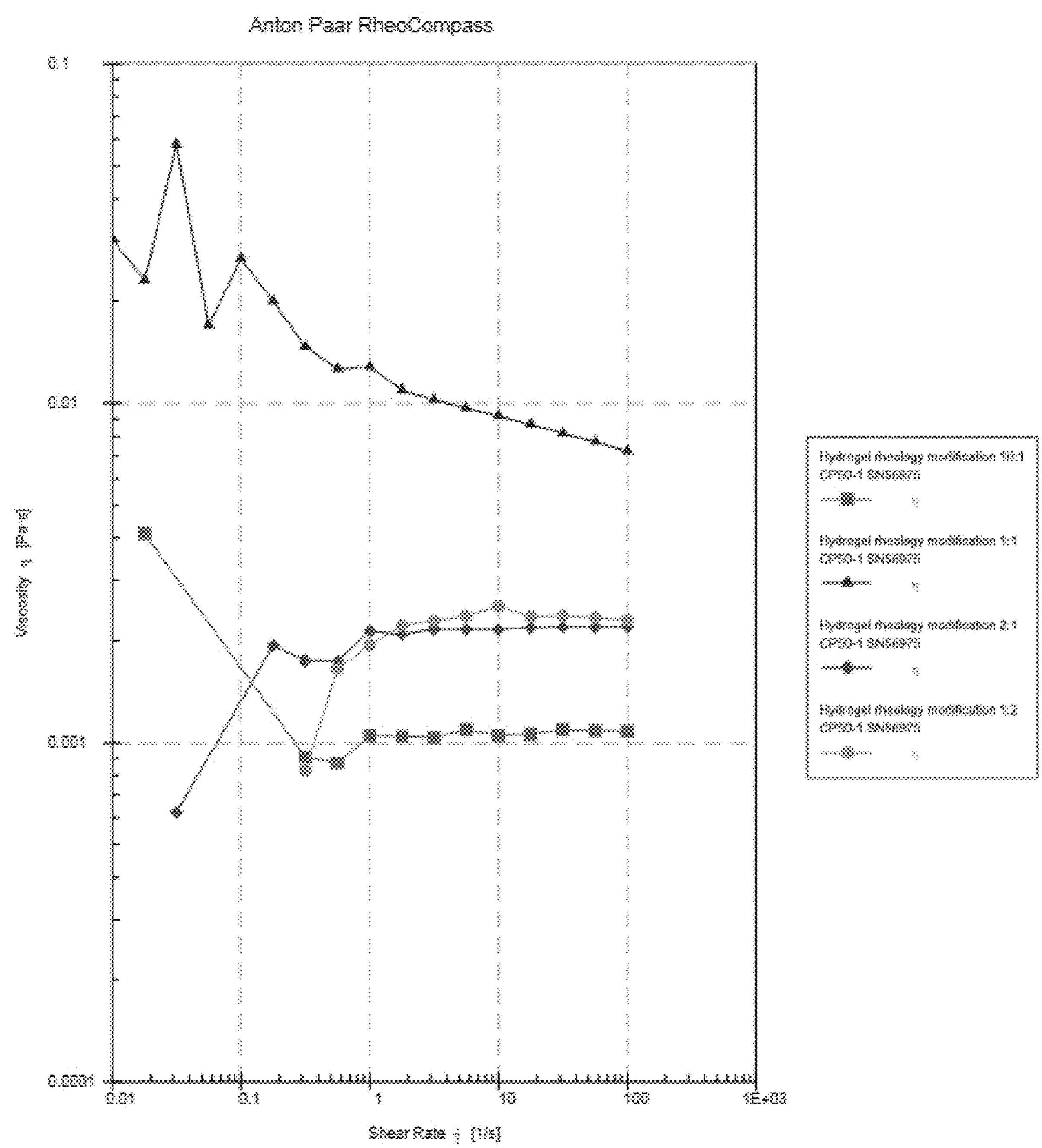
FIGS. 3-5 are graphs of viscosity as a function of shear rate for hydrogel solutions according to embodiments.

Shear rate vs. viscosity data are shown in FIG. 3. The results demonstrate that hydrogel solutions, without crosslinking to form a hydrogel, did not have significantly different viscosities than the viscosity of water.

Example 3

Rheological Analysis of Hydrogels Diluted with Water at Various Ratios

Hydrogels having a 1.0:0.5 lactose:methacrylic anhydride (mol:mol) ratio were prepared according to the method of Example 1. Compared to Example 2, the hydrogel precursor mixtures were irradiated and a hydrogel was formed.

The hydrogels were used to prepare hydrogel solutions according to the general procedure of Example 2 except that the hydrogel solutions were blended for 5 (instead of 15) minutes. Hydrogel solutions were prepared with the following weight:weight ratios of water to hydrogel: (E) 20:1—40 g water: 2 g hydrogel; (F) 40:1—80 g water: 2 g hydrogel; and (G) 50:1—100 g water: 2 g hydrogel.

The density of each solution was determined before the solution was tested on the MCR Rheometer as in Example 2. The density of each solution supernatant was about 1 g/mL.

Shear rate vs. viscosity data are shown in FIG. 4. The hydrogel solutions demonstrated shear thinning behavior. Water has a viscosity of 0.001 Pa·s, independent of shear rate. At low shear rates, the viscosities of the hydrogel solutions were more than 100,000 times greater than the viscosity of water. At high shear rates (100/s), the viscosities of the hydrogel solutions were about 1,000 times greater than the viscosity of water. Surprisingly, adding the hydrogels to bulk water modified the viscosity of the bulk water.

Example 4

Effects of Shear Time on Rheology Analysis of Hydrogels Diluted with Water

Hydrogels having a 1.0:0.5 lactose:methacrylic anhydride (mol:mol) ratio were prepared according to the method of Example 1. Compared to Example 2, the hydrogel precursor mixtures were irradiated and a hydrogel was formed.

The hydrogels were used to prepare hydrogel solutions according to the general procedure of Example 2 except that the hydrogel and were added to a 250 mL (instead of a 150 mL) beaker and the hydrogel solutions were blended for varying amounts of time as indicated below. Hydrogel solutions were prepared with the following weight:weight ratios of water to hydrogel: (H) 40:1, 5-min mix—40 g water:1 g hydrogel; (I) 40:1, 10-min mix—40 g water:1 g hydrogel; (J) 40:1, 15-min mix—40 g water:1 g hydrogel; (K) 40:1, 20-min mix—40 g water:1 g hydrogel; (L) 40:1, 30-min mix—40 g water:1 g hydrogel; and (M) 50:1, 15-min mix—50 g water:1 g hydrogel.

The density of each solution was determined before the solution was tested on the MCR Rheometer as in Example 2. The density of each solution supernatant was about 1 g/mL.

Shear rate vs. viscosity data are shown in FIG. 5. All hydrogel solutions ((H) to (M)) at all dilution ratios and mixing times demonstrated shear thinning behavior. Water has a viscosity of 0.001 Pa·s, independent of shear rate. The diluted and homogenized hydrogels demonstrated an increased viscosity compared to water.

As the high shear mixing time increased, the viscosity decreased. Without being limited to any mechanism or mode of action, the additional high shear time may have disrupted the hydrogel polymer network in the bulk solution and thereby decreased the viscosity of the bulk solution. The 50:1, 15-min mix solution (M) had a lower viscosity than the 40:1, 15-min mix solution (J), which demonstrates that the more dilute the hydrogel solution, the lower its viscosity. Even at low concentrations (e.g., 50:1 solution), the hydrogel significantly impacted solution viscosity compared to water. Surprisingly, adding the hydrogels to bulk water modified the viscosity of the bulk water.

Although the present disclosure provides references to preferred embodiments, persons skilled in the art will recognize that changes may be made in form and detail without departing from the spirit and scope of the invention.

What is claimed is:

1. A method of modifying the rheology of an agricultural composition, the method comprising:

providing an agricultural composition and a crosslinked hydrogel;

blending, under high shear, the crosslinked hydrogel in a liquid to produce a hydrogel solution; and adding the hydrogel solution to the agricultural composition, wherein the hydrogel solution modifies the rheology of the agricultural composition.

2. The method of claim 1, wherein a ratio of the liquid to the crosslinked hydrogel is from about 0.25:1 to about 60:1.

3. The method of claim 2, wherein the ratio of the liquid to the crosslinked hydrogel is from about 0.5:1 to about 10:1.

4. The method of claim 2, wherein the ratio of the liquid to the crosslinked hydrogel is from about 10:1 to about 50:1.

5. The method of claim 1, wherein the liquid is water.

6. The method of claim 1, wherein the crosslinked hydrogel comprises a sugar.

7. The method of claim 6, wherein the sugar comprises a dairy sugar.

8. The method of claim 6, wherein the sugar comprises lactose.

9. The method of claim 8, wherein the lactose is from one or more of purified lactose, milk permeate, whey, whey permeate, de-lactosed permeate, de-proteinized whey, dairy-derived polysaccharides, buttermilk, skim milk, mammalian milk, whole milk powder, non-fat dry milk, and butter milk powder.

10. The method of claim 8, wherein the lactose is from a waste product of a dairy or food processing operation.

11. The method of claim 10, wherein the waste product is milk permeate.

12. The method of claim 1, wherein the crosslinked hydrogel is formed with methacrylic anhydride as a crosslinking agent.

13. The method of claim 1, wherein the viscosity of the agricultural composition is increased or decreased.

14. The method of claim 1, wherein the agricultural composition is formulated as a liquid.

15. The method of claim 1, wherein the agricultural composition comprises at least one of an adjuvant, fertilizer, humectant, micronutrient, macronutrient, plant growth regulator, seed treatment, and pesticide.

16. The method of claim 1, wherein blending produces a hydrogel solution in which particles of the crosslinked hydrogel are dispersed.

* * * * *